United States Patent [19]

Eshenbach

[11] Patent Number: 5,663,735
[45] Date of Patent: Sep. 2, 1997

[54] GPS RECEIVER USING A RADIO SIGNAL FOR IMPROVING TIME TO FIRST FIX

[75] Inventor: Ralph F. Eshenbach, Woodside, Calif.

[73] Assignee: Trimble Navigation Limited, Sunnyvale, Calif.

[21] Appl. No.: 650,482

[22] Filed: May 20, 1996

[51] Int. Cl.[6] .............................. H04B 7/185; G01S 5/02
[52] U.S. Cl. .............................................. 342/357
[58] Field of Search ........................ 342/357; 455/67.6

[56] References Cited

U.S. PATENT DOCUMENTS

| | | | |
|---|---|---|---|
| 5,477,228 | 12/1995 | Tiwari et al. | 342/357 |
| 5,499,032 | 3/1996 | Kelley et al. | 342/357 |
| 5,523,761 | 6/1996 | Gildea | 342/357 |

*Primary Examiner*—Theodore M. Blum
*Attorney, Agent, or Firm*—David R. Gildea

[57] ABSTRACT

A global positioning system (GPS) receiver apparatus using time and frequency information derived from a radio signal other than the GPS satellite signal for improving the time to first fix (TTFF). The GPS receiver apparatus includes a GPS signal receiver for receiving a GPS satellite signal modulated with data bits and a radio signal receiver for receiving a radio signal having a standard time and/or a standard frequency. The radio signal receiver provides standard time information to the GPS signal receiver. The GPS signal receiver uses the standard time information to resolve a GPS time for a time of arrival of a data bit. The GPS signal receiver includes a propagation delay calibrator for correcting the standard time for the travel time due to the path length for the radio signal. The radio signal receiver uses a reference clock signal provided by the GPS signal receiver for determining a frequency error between a frequency of the reference clock signal and the standard frequency. The GPS signal receiver uses the frequency error for pre-tuning to the carrier frequency of the GPS satellite signal.

17 Claims, 5 Drawing Sheets

| HF STANDARD FREQUENCY AND TIME SIGNAL BROADCASTS ||||||
|---|---|---|---|---|---|
| Name | Country | Carrier Power (kW) | Broadcast Frequency (MHz) | Days/ Week | Hours/ Day |
| ATA | India | 8 | 5, 10, 15 | 7 | 24 |
| BPM | China | 10-20 | 2.5, 5, 10, 15 | 7 | 24 |
| CHU | Canada | 3-10 | 3.330, 7.335, and 14.670 | 7 | 24 |
| HLA | Republic of Korea | 2 | 5 | 5 | 7 |
| IAM | Italy | 1 | 5 | 6 | 2 |
| IBF | Italy | 5 | 5 | 7 | 2.75 |
| JJY | Japan | 2 | 2.5, 5, 8, 10, 15 | 7 | 24 |
| LOL | Argentina | 2 | 5, 10, 15 | 7 | 5 |
| OMA | Czecho-slovakia | 1 | 2.5 | 7 | 24 |
| RCH | USSR | 1 | 2.5, 5, 10 | 7 | 21 |
| RID | USSR | 1 | 5.004, 10.004, 15.004 | 7 | 24 |
| RIM | USSR | 1 | 5, 10 | 7 | 20.5 |
| RTA | USSR | 5 | 10, 15 | 7 | 20.5 |
| RWM | USSR | 5-8 | 4.996, 9.996, 14.996 | 7 | 24 |
| VNG | Australia | 10 | 5, 10, 15 | 7 | 24 |
| WWV | United States | 2.5-10 | 2.5, 5, 10, 15, 20 | 7 | 24 |
| WWVH | United States | 5-10 | 2.5, 5, 10, 15 | 7 | 24 |
| ZLFS | New Zealand | 0.3 | 2.5 | 1 | 3 |
| ZUO | South Africa | 4 | 2.5, 5 | 7 | 24 |

Fig. 2a

| LF and VLF Time and Frequency Stations ||||||
|---|---|---|---|---|---|
| Call Sign | Location | Power (kW) | Carrier (kHz) | Days/ Week | Hours/ Day |
| DCF77 | Mainflingen, Germany | 20 | 77.50 | 7 | 24 |
| GBR | Rugby, United Kingdom | 60 | 15.95 16.00 | 7 | 22 |
| HBG | Prangins, Switzerland | 20 | 75.00 | 7 | 24 |
| JJF-2 JG2AS | Sanwa, Sashima, Ibaraki, Japan | 10 | 40.00 | 7 | 24 |
| MSF | Rugby, United Kingdom | 25 | 60.00 | 7 | 24 |
| NAA | Cutler, Maine United States | 1000 | 24.00 | 7 | 24 |
| NCA | Aguada, Puerto Rico | 100 | 28.50 | 7 | 24 |
| NTD | Yoshima, Japan | 50 | 17.40 | 7 | 24 |
| NLK | Jim Creek, Washington, United States | 125 | 24.80 | 7 | 24 |
| NPM | Lualualei, Hawaii, United States | 600 | 23.40 | 7 | 24 |
| NSS | Annapolis, Maryland, United States | 400 | 21.40 | 7 | 24 |

Fig. 2b

| LF and VLF Time and Frequency Stations |||||||
|---|---|---|---|---|---|
| Call Sign | Location | Power (kW) | Carrier (kHz) | Days/ Week | Hours/ Day |
| NWC | NW Cape, Australia | 1000 | 22.30 | 7 | 24 |
| OMA | Liblice, Czechoslovakia | 5 | 50.00 | 7 | 24 |
| RBU | Moskva, USSR | 10 | 66.67 | 7 | 24 |
| RTZ | Irkutsk, USSR | 10 | 50.00 | 7 | 23 |
| RW-166 | Irkutsk, USSR | 40 | 200.00 | 7 | 23 |
| RW-76 | Novosibirsk, USSR | 150 | 272.00 | 7 | 22 |
| UNW3 | Molodechno, USSR | --- | 25.50, 25.10 25.00, 23.00 20.50 | 7 | 2 |
| UPD8 | Arkhangelsk, USSR | --- | 25.50, 25.10 25.00, 23.00 20.50 | 7 | 2 |
| UQC3 | Khabarovsk, USSR | 300 | 25.50, 25.10 25.00, 23.00 20.50 | 7 | 2 |
| USB2 | Frunze, USSR | --- | 25.50, 25.10 25.00, 23.00 20.50 | 7 | 3 |
| UTR3 | Gorky, USSR | 300 | 25.50, 25.10 25.00, 23.00 20.50 | 7 | 2 |

Fig. 2c

GPS RECEIVER USING A RADIO SIGNAL FOR IMPROVING TIME TO FIRST FIX

BACKGROUND OF THE INVENTION

1. Field of the Invention

The invention relates generally to global positioning system (GPS) receivers and more particularly to a GPS receiver apparatus having an improved time to first fix by using standard time and frequency information available from a radio signal.

2. Description of the Prior Art

Global positioning system (GPS) receivers are used in many applications where accurate time and geographical location are required. In several applications, it is important to minimize the time delay between when the GPS receiver is turned on and when it determines a GPS-based time and/or geographical location. This time delay, known as the time to first fix (TTFF) includes (i) time to tune the frequency of the GPS receiver to a carrier frequency of a GPS signal from a GPS satellite, (ii) time to align a phase of an internally generated pseudo-random noise (PRN) code to a PRN code in the GPS signal, (iii) time to receive data bits in the GPS signal to determine a GPS-based time, (iv) time to tune frequency and align phase to acquire a GPS signal from a second, a third, and a fourth GPS satellite, and (v) time to calculate a GPS-based geographical location. Fewer than four GPS satellites may be sufficient if the GPS receiver has other information such as altitude. The TTFF may include additional time delay if the GPS receiver does not already have an approximate time, its approximate geographical location, and ephemeris information for the locations in space of the GPS satellites. Existing GPS receivers have TTFFs in the range of a few tens of seconds to a few minutes.

The GPS signal is modulated with data bits at a fifty bits per second (BPS) rate (twenty milliseconds per bit) that are modulated by a coarse/acquisition (C/A) PRN code sequence at a 1.023 megahertz rate (one microsecond per chip) that is 1023 chips long (one millisecond). Each of the GPS satellites has a distinct PRN code that enables the GPS receiver to distinguish the GPS signal of one GPS satellite from the GPS signal of another GPS satellite. The data bits are organized into sub-frames that are six seconds in length. Each sub-frame includes a hand over word (HOW) that includes information for the GPS time of emission for a data bit. In existing GPS receivers, the time to receive the data bits to determine the GPS-based time includes up to six seconds to receive the GPS time in the HOW. Under some conditions the GPS receiver must receive more than one HOW, thereby adding more than one six second time increment to the TTFF.

The time to tune the frequency of the GPS receiver to the carrier frequency of the GPS signal depends upon the accuracy of an internal reference frequency. Some existing GPS receivers have eliminated or minimized this time by using a highly accurate internal reference oscillator such as an oven stabilized crystal oscillator or an atomic clock. However, such oscillators typically have a high power consumption and are expensive. Instead, most existing GPS receivers tune to the carrier frequency using a frequency search where first one frequency and then another is tried until a correct carrier frequency is found. Unfortunately, the time to do the frequency search increases the TTFF.

There is a need for a GPS receiver apparatus that determines GPS time without waiting for the HOW in the GPS signal and/or tunes to the GPS signal without using a highly accurate oscillator or frequency searching in order to have a fast time to first fix (TTFF).

SUMMARY OF THE INVENTION

It is therefore an object of the present invention to provide a global positioning system (GPS) receiver apparatus that uses standard time information derived from a radio signal other than the GPS satellite signal for determining a time of a transition between two data bits of the GPS satellite for providing a GPS-based time.

Another object is to provide a GPS receiver apparatus that uses standard frequency information of a radio signal other than the GPS satellite signal for pre-tuning the frequency of a GPS receiver apparatus for acquiring a GPS satellite signal.

Briefly, in a preferred embodiment, a global position system (GPS) receiver apparatus includes a GPS signal receiver for receiving a GPS signal having GPS time and geographical location determination data bits and a radio signal receiver for receiving a radio signal having a standard time and/or standard frequency information. The radio signal receiver provides the standard time information to the GPS signal receiver. The GPS signal receiver includes a downconverter for downconverting the GPS signal to a GPS intermediate frequency (IF) signal; a digital signal processor (DSP) for correlating the GPS IF signal to an internally generated GPS replica signal and providing correlation data; a reference oscillator for providing the reference clock signal to the DSP for generating the GPS replica signal; and a microcomputer for using the standard time information and the correlation data to resolve the GPS time for a time of arrival of a data bit and providing a GPS-based time and geographical location. The GPS signal receiver further includes a propagation delay calibrator for correcting the standard time information for a travel time due to a path length for the radio signal. Optionally, the radio signal receiver uses the reference clock signal for providing frequency error information for a difference between a multiple of a frequency of the reference clock signal and the standard frequency. The GPS signal receiver uses the frequency error information for pre-tuning the GPS signal receiver to the frequency of the GPS satellite signal.

An advantage of the GPS receiver apparatus of the present invention is that it uses standard time information in a radio signal for determining a GPS time, thereby improving a time to first fix (TTFF).

Another advantage of the GPS receiver apparatus of the present invention is that it uses standard frequency information in a radio signal for pre-tuning to the frequency of the GPS satellite signal, thereby improving a time to first fix (TTFF).

These and other objects and advantages of the present invention will no doubt become obvious to those of ordinary skill in the art after having read the following detailed description of the preferred embodiments which are illustrated in the various figures.

IN THE DRAWINGS

FIG. 2a is a table of stations broadcasting high frequency (HF) radio signals having a standard time and a standard frequency for reception by the radio signal receiver of FIG. 1;

FIGS. 2b and 2c are tables of stations broadcasting low or very low frequency (LF/VLF) radio signals having a standard time and a standard frequency for reception by the radio signal receiver of FIG. 1.

DETAILED DESCRIPTION OF THE PREFERRED EMBODIMENTS

Figure 1:
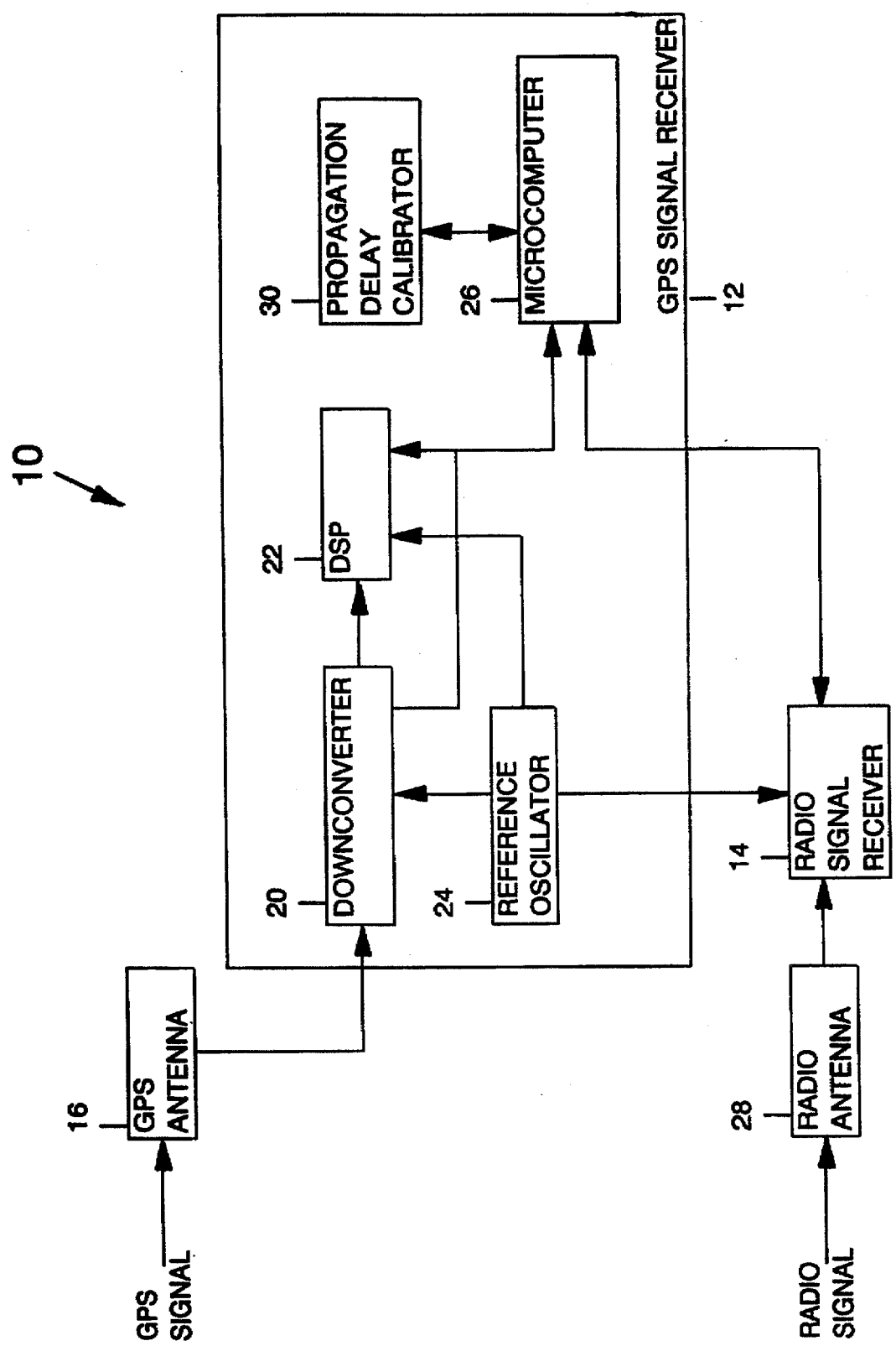
FIG. 1 is a block diagram of a GPS receiver apparatus of the present invention providing a fast time to first fix (TTFF)

FIG. 1 illustrates a block diagram of a global positioning system (GPS) receiver apparatus of the present invention referred to by the general reference number 10. The GPS receiver apparatus 10 includes a GPS signal receiver 12 for receiving a GPS signal from GPS satellites and a radio signal receiver 14 for receiving a radio signal having standard time and/or frequency information. The GPS signal includes a carrier signal that is modulated by data bits at a fifty BPS rate (twenty milliseconds per data bit). The data bits include information for determining a GPS-based time and geographical location. A pseudo-random noise (PRN) code sequence of 1023 chips that is distinct for each of the GPS satellites spreads the GPS signal by modulating the data bits at a chip rate of 1.023 megahertz (approximately one microsecond per chip) and a sequence rate of one kilohertz (one millisecond per sequence). A more complete description of the GPS signal is available in an "Interface Control Document ICD-GPS-200", revised in 1991, published by Rockwell International Corporation and incorporated herein by reference. The radio signal includes modulation for a standard time known to better than about ten milliseconds and optionally a standard carrier frequency that is known to better than about $1 \times 10^6$ and preferable better than $3.3 \times 10^7$. Several stations, such as WWV, WWVH, WWVB, CHU, and GOES broadcast radio signals having such standard time and frequency. A more complete list and description of such stations is given in FIGS. 2a, 2b, and 2c.

A GPS antenna 16 receives the GPS signal from an airwave that is broadcast by the GPS satellite and converts it into a conducted GPS signal for processing by the GPS signal receiver 12. The GPS signal receiver 12 includes a downconverter 20 connected to the antenna 16 for downconverting the frequency of the GPS signal to a GPS intermediate frequency (IF) signal; a digital signal processor (DSP) 22 connected to the downconverter 20 for generating a GPS replica signal, correlating the GPS replica signal to the GPS signal, and providing correlation data; a reference oscillator 24 connected for providing a reference clock signal for the downconverter 20 and the DSP 22; and a microcomputer 26 connected to the radio signal receiver 14 for receiving the standard time and/or frequency information and the DSP 22 for receiving the correlation data and providing application information including the GPS-based time and the geographical location. Preferably the center frequency of the GPS IF signal is twenty-five megahertz or less, however, any frequency including baseband that is suitable for digital processing can be used. The microcomputer 26 includes a microprocessor such as a 68HC030 available from Motorola Corporation, one or more memory devices for storing executable program code and variable data, clocking circuitry, a real time clock, and associated signal conditioning and input/output hardware. The microprocessor operates in a conventional manner for receiving digital signal inputs, processing information in the inputs according to the program code, and issuing digital signal outputs for controlling the elements of the GPS receiver apparatus 10 and providing the application information. Optionally, the DSP 22 and the microcomputer 26 may be combined into a single circuit element or single integrated circuit.

The GPS replica signal includes a selected frequency and a selected PRN code sequence having a selected phase matching an expected frequency and expected PRN code sequence of the GPS signal having a phase, respectively. The selected frequency and selected phase are based upon a frequency and phase of the reference clock signal and a frequency and a phase adjustment provided by the microcomputer 26 based upon the correlation data. The process of adjusting the frequency and phase of the GPS replica signal to match or correlate to the actual frequency and phase of the GPS IF signal is known as "acquiring" the GPS signal. When the frequency and phase adjustments are such that the GPS replica signal has the approximately the same phase and frequency as the GPS IF signal, the GPS signal receiver 12 is said to be "tracking" and the correlation data indicates the senses of the data bits in the GPS signal. More complete explanations of the known techniques for GPS signal receivers are available in U.S. Pat. No. 4,754,465 by Charlie R. Trimble and U.S. Pat. No. 4,847,862 by Paul E. Braisted and Ralph F. Eschenbach for GLOBAL POSITIONING SYSTEM COURSE ACQUISITION CODE RECEIVERs incorporated herein by reference.

A radio antenna 28 receives the radio signal from an airwave that is broadcast by a station and converts it into a conducted radio signal for processing by the radio signal receiver 14. The radio signal receiver 14 demodulates and decodes the radio signal and provides the information for the standard time to the microcomputer 26. The radio signal receiver 14 may be designed and constructed as a high frequency (HF) radio receiver for receiving a radio signal in a frequency range of 2.5 to 30 megahertz, a low frequency (LF) radio receiver for receiving a radio signal in a 30 to 300 kilohertz range, or a very low frequency (VLF) radio receiver for receiving a radio signal in a 3 to 30 kilohertz range. Such radio receivers are well-known in the field of signal receivers. Optionally, the radio signal receiver 14 receives the reference clock signal and provides the microcomputer 26 with information for a frequency error of a difference between a selected multiple of the frequency of the reference clock signal and the standard frequency of the radio signal. The multiple may be an integer or a ratio of two integers either greater than or less than one depending upon the desired clocking rate for the DSP 22 and the type of construction used in the radio signal receiver 14. Alternatively, the frequency error may be used to tune the frequency of the reference oscillator using a phase lock loop. In a preferred embodiment for acquiring the GPS signal, microprocessor 26 pre-tunes the frequency of the GPS signal receiver 12 by selecting an initial frequency adjustment based upon the frequency error information. Then, the microcomputer 26 and the DSP 22 cooperate to match the phase of the selected PRN code in the GPS replica signal to the phase of the PRN code in the GPS IF signal by trying PRN codes and phases until correlation is found indicating that the GPS signal has been acquired and the GPS signal receiver 12 is tracking.

As soon as the GPS signal receiver 12 is tracking the GPS signal, the microcomputer 26 uses the standard time, known to be accurate to within ten milliseconds, to determine the GPS time of a next sense transition of a data bit, having a twenty millisecond period, in the correlation data; thereby eliminating a requirement to wait up to six seconds or more until one or more HOWs are decoded. Optionally, when the GPS signal receiver 12 is tracking the GPS signal from more than one GPS satellite, the microcomputer 26 observes more than one stream of correlation data to minimize the likelihood that a sense transition is delayed by a long string of 1's or 0's. Executable program code for a propagation delay calibrator 30 is stored in the memory in the microcomputer 26 for enabling the microcomputer 26 to calibrate the standard time for a time delay due to the path length between a stored geographical location of the station transmitting the radio signal and a stored, last known or estimated geographical location of the GPS antenna 16.

FIGS. 2a, 2b, and 2c are tables of high frequency (HF) and low frequency and very low frequency (LF/VLF) standard frequency and time signal broadcasts, for use as the radio signal. The tables list names or call signs, countries or locations, powers in kilowatts, frequencies in megahertz or kilohertz, numbers of days of the week of broadcasting, and hours of the day of broadcasting.

Figure 3:
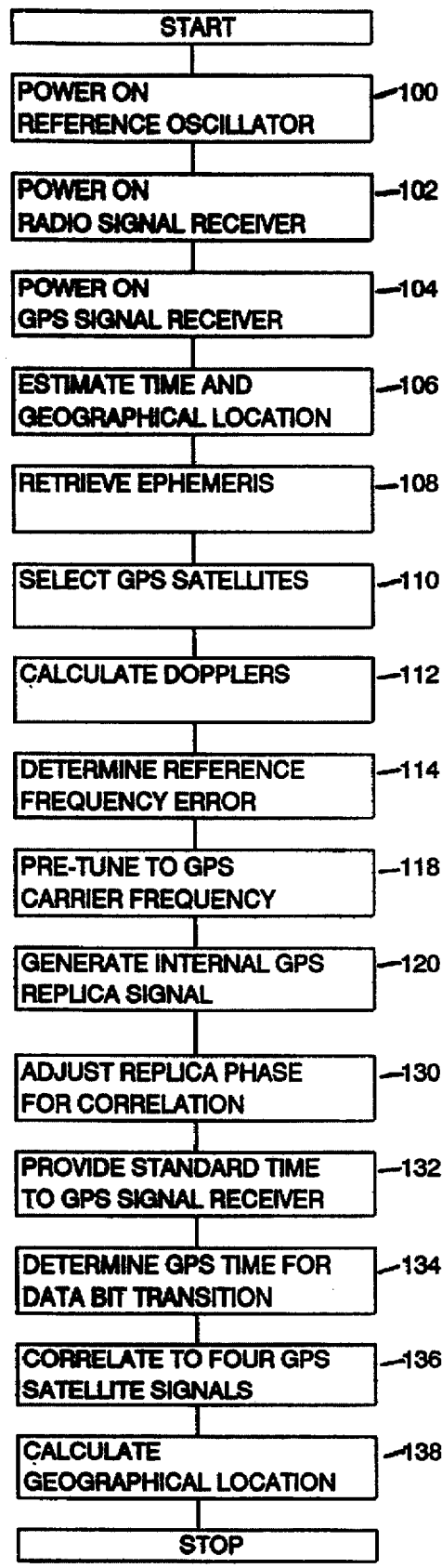
FIG. 3 is a flow chart of a method using the GPS receiver apparatus of FIG. 1 for a fast TTFF.

FIG. 3 illustrates flow chart of activities of the GPS receiver apparatus 10 leading up to a first fix of the GPS-based time and geographical location by the GPS signal receiver 12. At the start, the GPS receiver apparatus 10 is powered off or in a standby mode where at least one of the downconverter 20, DSP 22, and the microcomputer 26 are inhibited from using full operational power. In a step 100 the reference oscillator is powered on. For some applications, the power to the reference oscillator 24 remains on continuously. In a step 102 the radio signal receiver 14 is powered on and receives the reference clock signal and the radio signal. In a step 104 the GPS signal receiver 12 is powered on or is switched from a standby mode to a normal operational mode. In a step 106 the GPS signal receiver 12 estimates an approximate time based upon time information from the real time clock and an estimated geographical location for the GPS antenna 16 based upon a last known location and last known velocity. In a step 108 the GPS signal receiver 12 retrieves ephemeris information for the locations in space of the GPS satellites. In a step 110 the GPS signal receiver 12 uses the approximate time, estimated geographical location, and ephemeris information to select one or more GPS satellites for acquisition of the GPS signal. In a step 112 the GPS signal receiver 12 calculates Doppler shifts for the carrier frequencies of the GPS signal for the GPS satellites that were selected. In a step 114 the radio signal receiver 14 determines the frequency error for the difference between the selected multiple of the frequency of the reference clock signal and the standard frequency of the radio signal and provides the frequency error information to the GPS signal receiver 12. In a step 118 the GPS signal receiver uses the Doppler shift and the frequency error information to pre-tune to the expected carrier frequency of the GPS signal from the selected GPS satellite. In a step 120 the GPS signal receiver 12 generates the GPS replica signal having the PRN code for the selected GPS satellite. The GPS signal receiver 12 is now ready to acquire the GPS signal.

In a step 130 the GPS signal receiver 12 adjusts the GPS replica signal PRN code phase until the GPS replica signal correlates to the GPS IF signal. The GPS signal receiver 12 is now tracking and receiving data bits from at least one GPS satellite. In a preferred embodiment, the GPS signal receiver 12 operates to pre-tune to the carrier frequencies from several GPS satellites and correlate with several PRN codes in parallel. In a step 132 the radio signal receiver 14 provides the standard time information to the GPS signal receiver 12. In a step 134 the GPS signal receiver 12 applies the standard time information to determine the GPS-based time for the time of arrival of the transition of the sense between two data bits. When the GPS signal from more than one GPS satellite is being tracked, the GPS signal receiver 12 uses the data bit streams from any one of the GPS satellites in order to insure an timely transition will occur. In a step 136 the GPS signal receiver 12 correlates to the GPS signal from four GPS satellites. In a step 138 the GPS signal receiver 12 uses the GPS time, the ephemeris information, and the phases of the GPS replica PRN code sequence to calculate the GPS-based geographical location for the GPS antenna 16.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver apparatus, comprising:

a radio signal receiver for receiving a radio signal having a standard time, decoding said standard time from said radio signal, and providing information for said standard time in a radio receiver output signal; and a GPS signal receiver for receiving a GPS signal having data bits and coupled to the radio signal receiver for using said standard time information for resolving a GPS-based time for a time of arrival of one of said data bits.

2. The GPS receiver apparatus of claim 1, wherein:

the GPS signal receiver includes a propagation delay calibrator for calibrating said standard time information for a path length of said radio signal.

3. The GPS receiver apparatus of claim 1, wherein:

the radio signal receiver includes a low frequency (LF) radio signal receiver for receiving said radio signal from at least one of (i) WWVB, (ii) DCF77, (iii) HBG, (iv) JJF-2, (v) JG2AS, (vi) MSF, (vii) OMA, (viii) RBU, (ix) RTZ, (x) RW-166, and (xi) RW-76.

4. The GPS receiver apparatus of claim 1, wherein:

the radio signal receiver includes a high frequency (HF) radio signal receiver for receiving said radio signal from at least one of (i) WWV, (ii) WWVH, (iii) CHU, (iv) ATA, (v) BPM, (vi) HLA, (vii) IAM, (viii) IBF, (ix) JJY, (x) LOL, (xi) OMA, (xii) RCH, (xiii) RID, (xiv) RIM, (xv) RTA, (xvi) RWM, (xvii) VNG, (xviii) ZLFS, and (xix) ZUO.

5. The GPS receiver apparatus of claim 1, wherein:

the radio signal receiver includes a very low frequency (VLF) radio signal receiver for receiving said radio signal from at least one of (i) GBR, (ii) NAA, (iii) NCA, (iv) NTD, (v) NLK, (vi) NPM, (vii) NSS, (viii) NWC, (ix) UNW3, (x) UPD8, (xi) UQC3, (xii) USB2, and (xiii) UTR3.

6. The GPS receiver apparatus of claim 1, wherein:

the radio signal receiver includes a GOES satellite signal receiver for receiving said radio signal from a GOES satellite.

7. The GPS receiver apparatus of claim 1, further including:

a reference oscillator for providing a reference clock signal;

a microcomputer for receiving frequency error information for a difference between a frequency of said radio signal and a multiple of a frequency of said reference clock signal, and providing a responsive frequency adjustment; and a digital signal processor for using said frequency adjustment for pre-tuning to a frequency of said GPS signal; and wherein the radio signal receiver is further for receiving said reference clock signal and providing said frequency error information.

8. The GPS receiver apparatus of claim 1, wherein:

the GPS receiver includes a digital signal processor for receiving a GPS intermediate frequency signal and providing said one of said data bits having said time of arrival; and a microcomputer for receiving said one of said data bits and resolving said GPS-based time for said time of arrival.

9. A global positioning system (GPS) receiver apparatus, comprising:

a radio signal receiver for receiving a radio signal having an accurate carrier frequency and for providing frequency error information for a difference between said carrier frequency and a multiple of a frequency of a reference clock signal; and a GPS signal receiver coupled to the radio signal receiver, including:
 a) a reference oscillator for providing said reference clock signal;
 b) a microcomputer for using said frequency error information for providing a frequency adjustment; and
 c) a digital signal processor for using said frequency adjustment for pre-tuning to a frequency for acquiring a GPS signal.

10. The GPS receiver apparatus of claim 8, wherein:

the radio signal receiver includes a low frequency (LF) radio signal receiver for receiving said radio signal from at least one of (i) WWVB, (ii) DCF77, (iii) HBG, (iv) JJF-2, (v) JG2AS, (vi) MSF, (vii) OMA, (viii) RBU, (ix) RTZ, (x) RW-166, and (xi) RW-76.

11. The GPS receiver apparatus of claim 9, wherein:

the radio signal receiver includes a high frequency (HF) radio signal receiver for receiving said radio signal from at least one of (i) WWV, (ii) WWVH, (iii) CHU, (iv) ATA, (v) BPM, (vi) HLA, (vii) IAM, (viii) IBF, (ix) JJY, (x) LOL, (xi) OMA, (xii) RCH, (xiii) RID, (xiv) RIM, (xv) RTA, (xvi) RWM, (xvii) VNG, (xviii) ZLFS, and (xix) ZUO.

12. The GPS receiver apparatus of claim 9, wherein:

the radio signal receiver includes a very low frequency (VLF) radio signal receiver for receiving said radio signal from at least one of (i) GBR, (ii) NAA, (iii) NCA, (iv) NTD, (v) NLK, (vi) NPM, (vii) NSS, (viii) NWC, (ix) UNW3, (x) UPD8, (xi) UQC3, (xii) USB2, and (xiii) UTR3.

13. The GPS receiver apparatus of claim 9, wherein:

the radio signal receiver includes a GOES satellite signal receiver for receiving said radio signal from a GOES satellite.

14. The GPS receiver apparatus of claim 9, wherein:

said carrier frequency has an accuracy of at least $1 \times 10^{-6}$.

15. A method for improving time to first fix in a global positioning system (GPS) receiver apparatus for receiving a GPS signal, comprising steps of:

receiving a radio signal having a standard time;

decoding said standard time from said radio signal;

receiving said GPS signal having data bits; and using said standard time for resolving a GPS-based time for a time of arrival of one of said data bits.

16. A method for improving time to first fix in a global positioning system (GPS) receiver apparatus for receiving a GPS signal, comprising steps of:

receiving a radio signal having an accurate carrier frequency;

providing a reference clock signal;

determining a frequency error for a difference between said carrier frequency and a multiple of a frequency of said reference clock signal;

using said frequency error for computing a frequency adjustment; and using said frequency adjustment in a digital signal processor in said GPS receiver for pre-tuning to a frequency for acquiring said GPS signal.

17. The method of claim 16, wherein:

said carrier frequency has an accuracy of at least $1 \times 10^{-6}$.

* * * * *